United States Patent
Pasqua et al.

(10) Patent No.: US 9,774,265 B2
(45) Date of Patent: Sep. 26, 2017

(54) WAKE UP MANAGEMENT CIRCUIT FOR A POWER SWITCHING CONVERTER

(71) Applicant: STMicroelectronics S.r.l., Agrate Brianza (IT)

(72) Inventors: Alfio Pasqua, Piedimonte Etneo (IT); Salvatore Tumminaro, Marianopoli (IT); Andrea Rapisarda, Motta S. Anastasia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 72 days.

(21) Appl. No.: 14/644,290

(22) Filed: Mar. 11, 2015

(65) Prior Publication Data

US 2015/0280586 A1 Oct. 1, 2015

(30) Foreign Application Priority Data

Mar. 31, 2014 (IT) ................ MI2014A0559

(51) Int. Cl.
  *H02M 3/335* (2006.01)
  *H02M 3/337* (2006.01)
  *H02M 1/00* (2006.01)

(52) U.S. Cl.
  CPC ..... *H02M 3/33515* (2013.01); *H02M 3/3376* (2013.01); *H02M 3/33523* (2013.01); *H02M 2001/0035* (2013.01); *Y02B 70/16* (2013.01)

(58) Field of Classification Search
  CPC ............. H02M 3/335; H02M 3/33515; H02M 3/33525; H02M 3/3376; H02M 2001/0035; Y02B 70/16
  (Continued)

(56) References Cited

U.S. PATENT DOCUMENTS 7,450,402 B2 * 11/2008 Jitaru ................ H02M 3/33584
  363/17
7,463,497 B2 * 12/2008 Negrete ............ H02M 3/33507
  363/21.12
(Continued)

FOREIGN PATENT DOCUMENTS

CN  103312176 A  9/2013
EP  2639951 A2  9/2013

OTHER PUBLICATIONS

IT Search Report and Written Opinion for IT MI2014A000559 dated Dec. 22, 2014 (10 pages).

(Continued)

*Primary Examiner* — Kyle J Moody
(74) *Attorney, Agent, or Firm* — Gardere Wynne Sewell LLP

(57) ABSTRACT

A power switching converter includes a switch coupled to an input terminal through a primary winding of a transformer and a control circuit configured to drive the switch to provide a regulated output signal at a secondary winding of the transformer. A wake up circuit is provided to force the switching-on of the switch when the power converter enters in a burst mode. The wake up circuit includes a transmitting section coupled to the secondary winding and a receiving section coupled to an auxiliary winding of the transformer and the control circuit. The transmitting section is configured to provide a wake up signal communicated in a wireless manner to the receiving section when the output signal falls below a threshold value.

12 Claims, 4 Drawing Sheets

(58) Field of Classification Search
USPC ....... 363/21.14, 21.17, 89, 21.06, 52, 55, 84
See application file for complete search history.

(56) References Cited

U.S. PATENT DOCUMENTS

| | | | | |
|---|---|---|---|---|
| 7,471,522 | B2* | 12/2008 | Ng | H02M 3/33523 363/21.12 |
| 8,570,772 | B2* | 10/2013 | Morris | H02M 1/32 363/21.14 |
| 8,873,254 | B2* | 10/2014 | Morris | H02M 3/335 363/21.14 |
| 8,953,342 | B2* | 2/2015 | Fang | H02M 3/33507 363/147 |
| 9,413,246 | B2* | 8/2016 | Luo | H02M 3/33507 |
| 9,520,769 | B2* | 12/2016 | Pasqua | H02M 1/36 |
| 9,595,861 | B2* | 3/2017 | Tumminaro | H02M 1/08 |
| 2013/0250627 | A1 | 9/2013 | Herfurth | |
| 2015/0303816 | A1* | 10/2015 | Tumminaro | H02M 1/08 363/21.04 |
| 2015/0318777 | A1* | 11/2015 | Pasqua | H02M 1/36 363/21.13 |
| 2016/0043647 | A1* | 2/2016 | Rapisarda | H02M 3/33507 363/21.12 |
| 2016/0181932 | A1 | 6/2016 | Kikuchi et al. | |

OTHER PUBLICATIONS

First Office Action and Search Report from co-pending CN Appl. No. 201510144874.9 dated Feb. 28, 2017 (8 pages).

* cited by examiner

WAKE UP MANAGEMENT CIRCUIT FOR A POWER SWITCHING CONVERTER

PRIORITY CLAIM

This application claims priority from Italian Application for Patent No. MI2014A000559 filed Mar. 31, 2014, the disclosure of which is incorporated by reference.

TECHNICAL FIELD

The present disclosure relates to a power switching converter, particularly to a DC-DC switching converter.

BACKGROUND

The present disclosure relates to power switching converters providing a constant current to a load, for example a battery, with high efficiency. The present disclosure more particularly relates to a switched voltage and current regulator whose load should be isolated from the supply source of the regulator, frequently the 220-volt mains.

For example, a conventional power switching converter is the flyback converter wherein a transformer with a primary winding and a secondary winding is provided for isolating the load from the voltage source. The primary winding is connected to the voltage source through a power switch while the secondary winding is connected to a load by means of a diode and a filtering capacitor is connected in parallel to the load.

When the switch switches-on, a first current flows on the primary winding and increases from an initial value as a function of the values of the voltage source and of the inductance provided by the primary winding. During this time, no current flows on the secondary winding because the diode is reverse biased and the power is stored in the core of the transformer.

When the switch switches-off, the current on the primary winding is abruptly switched-off and the power that was just stored in the core is transferred into the secondary winding. A second current on the secondary winding abruptly reaches a peak value equal to the peak current reached by the first current multiplied by the ratio between the number of turns of the primary winding and the secondary winding, when the switch is switched-off. The second current starts to decrease as a function of the inductance of the secondary winding and of the voltage across the load.

The amount of power transferred from the primary winding to the secondary winding depends upon the switching duty cycle of the switch. For this purpose, the power switching converter comprises a control circuit for driving the switch; the control circuit is configured to receive a feedback signal and operate the modification of the width of the control pulses of the switch.

The feedback control is provided by means of an opto-coupler or an auxiliary winding. In the last case, the auxiliary winding gives an image of the output voltage, being directly in phase with the secondary winding.

In conditions of light load the power switching converter is typically made operate in the so-called "burst-mode". With this operating mode the converter operates intermittently, with series (bursts) of switching cycles separated by time intervals during which the converter does not switch (idle time). When the load is such that the converter has just entered burst-mode operation, the idle time is short; as the load decreases, the duration of the bursts decreases as well and the idle time increases. In this way, the average switching frequency is considerably reduced and, consequently, the switching losses associated to the parasitic elements in the converter and the conduction losses related to the flow of reactive current in the transformer are reduced. The duration of the bursts and the idle time are determined by the feedback loop so that the output voltage of the converter always remains under control.

In the case wherein the feedback of the output voltage is formed by means of an auxiliary winding, the minimum frequency of the burst-mode operation is determined by the control circuit of the switch; during the burst-mode operation, the control circuit periodically forces the switching-on of the switch with a certain "restart" frequency in order to receive the feedback signal.

Thus, the power switching converter provides a fixed power which is independent from the load and this power needs to be dissipated to avoid that in case of low or zero load the converter goes out of regulation. To this purpose, a dummy load is typically used.

That power to dissipate mainly depends on the "restart" frequency, which cannot be chosen too low. In fact, during the time period between two subsequent commutations of the switch, the control circuit is not able to respond to an eventual variation of the load at the output terminal. Only when a commutation of the switch occurs the converter responds providing to the load the required power.

In the worst case, when a variation of the load from zero to a maximum value occurs, the current absorbed by the load is supported by the output capacitor and the voltage drop of the output voltage depends on the value of the capacitance of said output capacitor (higher the output capacitance, lower the voltage drop), on the "restart" frequency (lower the frequency, higher the voltage drop) and on the maximum output current. A trade-off between burst-mode consumption and the value of the output capacitor is needed during the design phase of the power switching converter.

However, to obtain acceptable power dissipation values is necessary to choose a relatively low "restart" frequency, which means a choice of an excessive output capacitance.

To overcome this problem, a known solution is to use a so-called wake up circuit configured to force the switching-on of the switch when a variation of the load occurs between two subsequent commutations during the burst-mode. This solution allows low power consumption without using a large output capacitor.

SUMMARY

One aspect of the present disclosure is to provide a switching power converter with an innovative wake up circuit.

One aspect of the present disclosure is a power switching converter comprising: an input terminal configured to receive an input signal, an output terminal connectable to a load, a switch coupled to the input terminal, a control circuit configured to drive said switch to provide at the output terminal a regulated output signal, a wake up circuit configured to force the switching-on of the switch when the power converter enters in a burst-mode, wherein the wake up circuit comprises a transmitting section, coupled to the output terminal, and a receiving section, coupled to the control circuit, said transmitting section being configured to provide a wake up signal to the receiving section in a wireless way when the output signal falls below a prefixed threshold value.

BRIEF DESCRIPTION OF THE DRAWINGS

For a better understanding of the present invention, a preferred embodiment thereof is now described, purely by way of non-limiting example and with reference to the annexed drawings, wherein.

DETAILED DESCRIPTION

Figure 1:
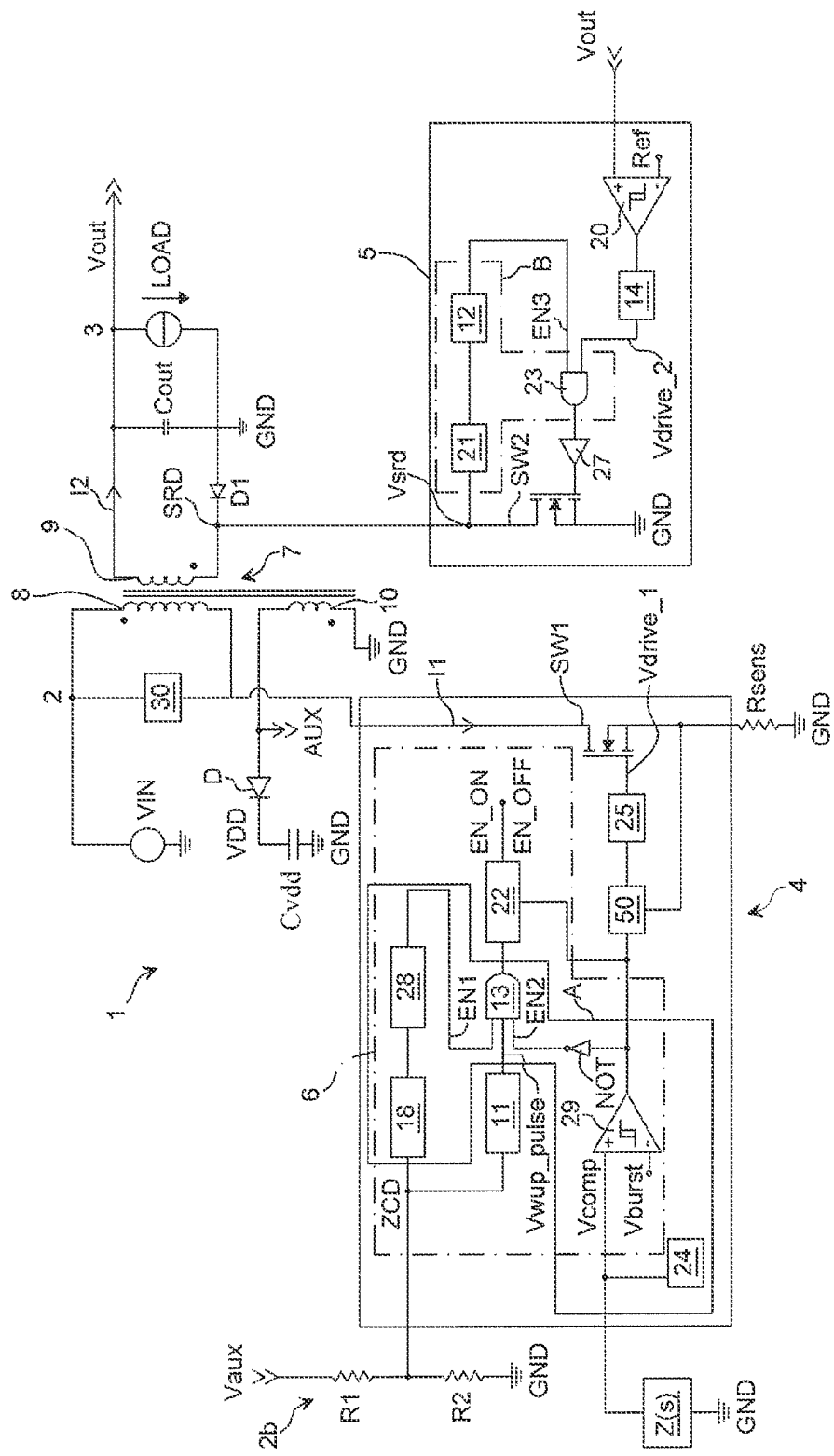
FIG. 1 is a block diagram of a switching power converter according to the present disclosure.

FIG. 1 illustrates a switching converter 1 according to the present disclosure. The switching converter 1 comprises an input terminal 2 configured to receive an input signal Vin, and an output terminal 3 configured to provide a regulated output signal Vout for supplying a load LOAD. For example, the input signal Vin is a rectified mains voltage (110 or 220V).

The power converter 1 then comprises a switch SW1 coupled to the input terminal 2, and a control circuit 4 configured to drive said switch SW1 for regulating the input signal Vin and providing at the output terminal 3 the regulated output signal Iout, Vout. More particularly, the switch SW1 is a power Mosfet with its drain terminal coupled with the input terminal 2, its source terminal connected with a sensing resistor Rsens, and its gate terminal connected with the control circuit 4.

For example, the power converter 1 is a so-called flyback converter comprising a transformer 7 with a primary winding 8 coupled with the input terminal 2, a secondary winding 9 coupled with the output terminal 3 and an auxiliary winding 10 coupled with the control circuit 4. In particular, the primary winding 8 is arranged between the input terminal 2 and the drain terminal of the power Mosfet SW1, and the secondary winding 9 is arranged between the output terminal 3 and the cathode of a rectification diode D1 with its anode connected to a ground reference GND. Preferably a snubber circuit 30 is arranged in parallel with the primary winding 8.

An output capacitor Cout is also connected in parallel to the load LOAD.

The auxiliary winding 10 provides the supply voltage to the control circuit 4 by means of a capacitor Cvdd which sets a voltage VDD, said capacitor Cvdd being coupled with the auxiliary winding 10 through a diode D. At the same time, the auxiliary winding 10 is directly in phase with the secondary winding 9, giving an image of the output signal Vout. The voltage across the auxiliary winding 10 is thus proportional to the voltage across the secondary winding 9.

The control circuit 4 is configured to provide a control signal Vdrive_1 to drive the switch SW1 by processing a feedback voltage Vaux, which is the voltage across the auxiliary winding 10.

The control circuit 4 (FIG. 2, 3) comprises at least a pulse width modulation (PWM) circuit 50 configured to generate, through a driver 25 directly connected to switch SW1, the control signal Vdrive_1. The circuit 50 (FIG. 2) receives from a block 51 a signal representative of the zero cross of the voltage Vaux and may receive a reset signal in response to the comparison between the voltage Vsense across the resistance Rsens and a voltage Vcomp, which is an error voltage Verror across an impedance Z(s); the error voltage Verror is due to the comparison between the feedback voltage Vaux and a predetermined voltage Vref. Particularly, the reset signal is sent to the circuit 50 when the error voltage Verror is equal to or higher than the voltage Vsens. More particularly, the error voltage Verror is due to the comparison between a sampled voltage Vzcd, which is proportional to the voltage Vaux, and the predetermined voltage Vref. The circuit 50 also receives a restart signal from a block 52.

In operation, when control circuit 4 switches-on the switch SW1, a first current I1 flows through the primary winding 8 and increases from an initial value as a function of the values of the input signal Vin and of the inductance provided by the primary winding 8. During this time, no current flows through the secondary winding 9 because the diode D1 is reverse biased and the power is stored in the core of the transformer 7.

When control circuit 4 switches-off the switch SW1, the current flowing through the primary winding 8 is abruptly switched-off and the power that was just stored in the core is transferred into the secondary winding 9. A second current I2 flowing through the secondary winding 9 abruptly reaches a peak value equal to the peak current reached by the first current I1 multiplied by the ratio between the number of turns of the primary winding 8 and the secondary winding 9, when the switch SW1 is switched-off. The second current I2 starts to decrease as a function of the inductance of the secondary winding 9 and of the load LOAD.

At the presence of light or zero load LOAD, the switching converter 1 operates in burst-mode. In order to receive the information regarding the output signal Vout, that is the feedback voltage Vaux, the control circuit 4 periodically forces the switching-on of the switch SW1 with a certain "restart" frequency. Thus, the power switching converter 1 provides a fixed power which is independent from the load LOAD which needs to be dissipated to avoid that the converter 1 goes out of regulation.

During the time period between two subsequent switching-on of the switch SW1, the control circuit 4 is not able to respond to an eventual variation of the load LOAD. Only when a commutation of the switch SW1 occurs, the converter 1 responds providing the required power to the load LOAD. To this purpose, the switching converter 1 comprises a wake up circuit 5, 6 configured to force the switching-on of the switch SW1, when the power converter 1 enters in a burst-mode, for detecting the output signal Vout.

The wake up circuit 5, 6 (FIG. 1) comprises a transmitting section 5, coupled to the output terminal 3, and a receiving section 6, coupled to the control circuit 4. The transmitting section 5 is configured to provide a wake up signal Vaux_pulse to the receiving section 6 in a wireless way when the output signal Vout falls below a prefixed threshold value Ref.

The receiving section 6 comprises a first enabling circuit A configured to enable the transfer of the wake up signal Vaux_pulse from the transmitting section 5 to the control circuit 4 when the switch SW1 is off and after a first time period T_mask from the final time instant of the demagnetization t_burst of the transformer 7.

This is explained by the fact that the last switching-off time instant of the switch SW1, after which the switching converter 1 enters in burst-mode, is followed by a series of voltage fluctuations on the auxiliary winding 10 due to the power exchange between the magnetization inductance of the transformer 7 and the parasitic capacitance Cpdrain in the drain terminal of the power Mosfet SW1. Said voltage fluctuations have a similar characteristic of the wake up signals Vaux_pulse and can be interpreted by the control circuit 4 as a series of wake up signals Vaux_pulse which could activate the switching-on the switch SW1. This is an undesired event because further power could be provided to the load LOAD causing a not controlled increase of the output signal Vout.

For this reason, it is important that the first time period T_mask is set by the first enabling circuit A such that the voltage fluctuations amplitude on the auxiliary winding 10 has a suitable value that is not detectable by the control circuit 4.

On the other hand, the transmitting section 5 comprises a second enabling circuit B configured to provide the wake up signal Vaux_pulse to the receiving section 6 after a second time period T_inhibit from the final time instant of the demagnetization t_burst of the transformer 7, said second time period T_inhibit being greater than the first time period T_mask.

In fact, if during the first period of time T_mask an increasing of the output signal Iout occurs, the control circuit 4 would be not able to detect the wake up signal Vaux_pulse. For this reason, the second enabling circuit B has to wait for a period of time greater than the first time period T_mask to provide the wake up signal Vaux_pulse to the receiving section 6, in order that it could be correctly detected by the control circuit 4.

Thus, when the output signal Vout falls below a prefixed threshold value Ref, the second enabling circuit B sends the wake up signal Vaux_pulse after the second time period T_inhibit; the time period T_inhibit is greater than the first time period T_mask.

Figure 2:
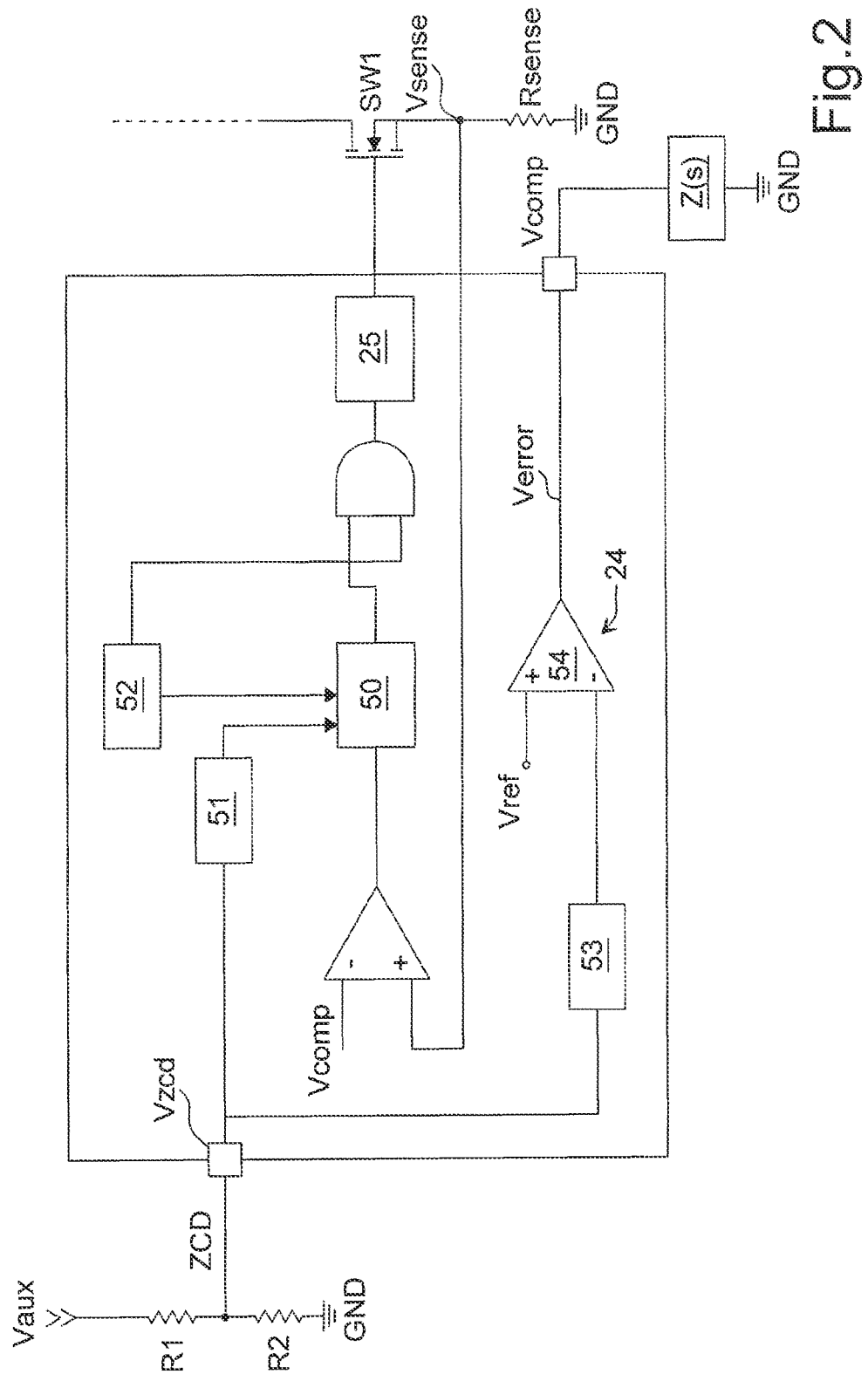
FIG. 2 is a first particular of the block diagram of FIG. 1.

The first enabling circuit A comprises a first detector 18 cascaded with a first signal generator 28; said first detector 18 is coupled to the auxiliary winding 10 and is configured to detect the demagnetization of the transformer 7 through the feedback voltage Vaux across the auxiliary winding 10 and to define the time instant t_burst, that is the initial time instant of the time period T_mask, as the final time instant of the demagnetization of the transformer 7. In particular, the first detector 18 is connected to a pin ZCD which is the output terminal of a voltage divider 26 comprising resistors R1, R2 arranged in parallel to the auxiliary winding 10 and is the input terminal of the zero-cross detector (FIG. 2). Thus, the voltage Vzcd detected by the first detector 18 is proportional to the feedback voltage Vaux.

The first signal generator 28 is configured to generate a first enabling signal EN1 after the first time period T_mask from the time instant t_burst.

Furthermore, the first enabling circuit A comprises a first voltage comparator 29, coupled with the auxiliary winding 10 and configured to compare the voltage Vcomp with a voltage reference Vburst and generate, as a result of the comparison, a second enabling signal EN2. Preferably, the first voltage comparator 29 is a hysteresis voltage comparator. Particularly, the voltage Vcomp (FIG. 2) is provided by a comparison circuit 24 comprising a sample and hold circuit 53 configured to sample the voltage Vzcd, and a comparator 54 configured to perform the comparison between the sampled voltage Vzcd and the predetermined voltage Vref and provide, as a response, the error voltage Verror across the impedance Z(s), which is the voltage Vcomp.

Finally, the first enabling circuit A comprises and an AND logic gate 13 which has at its inputs the first enabling signal EN1, the second enabling signal EN2 and a wake up pulse Vwup_pulse. The wake up pulse Vwup_pulse is a signal provided by a wake up detector 11, coupled with auxiliary winding 10, as a response to the detection of the wake up signal Vaux_pulse. The second enabling signal EN2 is provided to the AND logic gate 13 by means of a not logic gate NOT cascaded to the first voltage comparator 29.

The AND logic gate 13 is configured to provide the wake up pulse Vwup_pulse to a driving section 22 connected to the control circuit 4 at the presence of the enabling signals EN1 and EN2. The driving section 22 preferably provides a disabling signal EN_OFF to turn off the circuits comprised in the control circuit 4, which do not play an active part during the burst-mode operation of the switching converter 1 and an enabling signal EN_ON to turn on said circuits during the typical switching operation.

The transmitting section 5 comprises a second voltage comparator 20 and a further switch SW2 coupled between the secondary winding 9 and the ground reference GND. The voltage comparator 20 is configured to compare the output signal Vout with the prefixed threshold value Ref and, if the output signal Vout is lower than the prefixed threshold value Ref, to generate by means of a pulse generator 14 a driving signal V_drive2 suitable to switching-on the further switch SW2.

The second enabling circuit B comprises a second detector 21 cascaded with a second signal generator 12, said second detector 12 being coupled with the secondary winding 9 and configured to detect the demagnetization of the transformer 7 through the voltage across the secondary winding 9 and define the time instant t_burst of the switch SW1 in the same way of the detector 18. In particular, the second detector 21 detects a voltage Vsrd at a terminal SRD, which is voltage the across the secondary winding 9.

Figure 3:
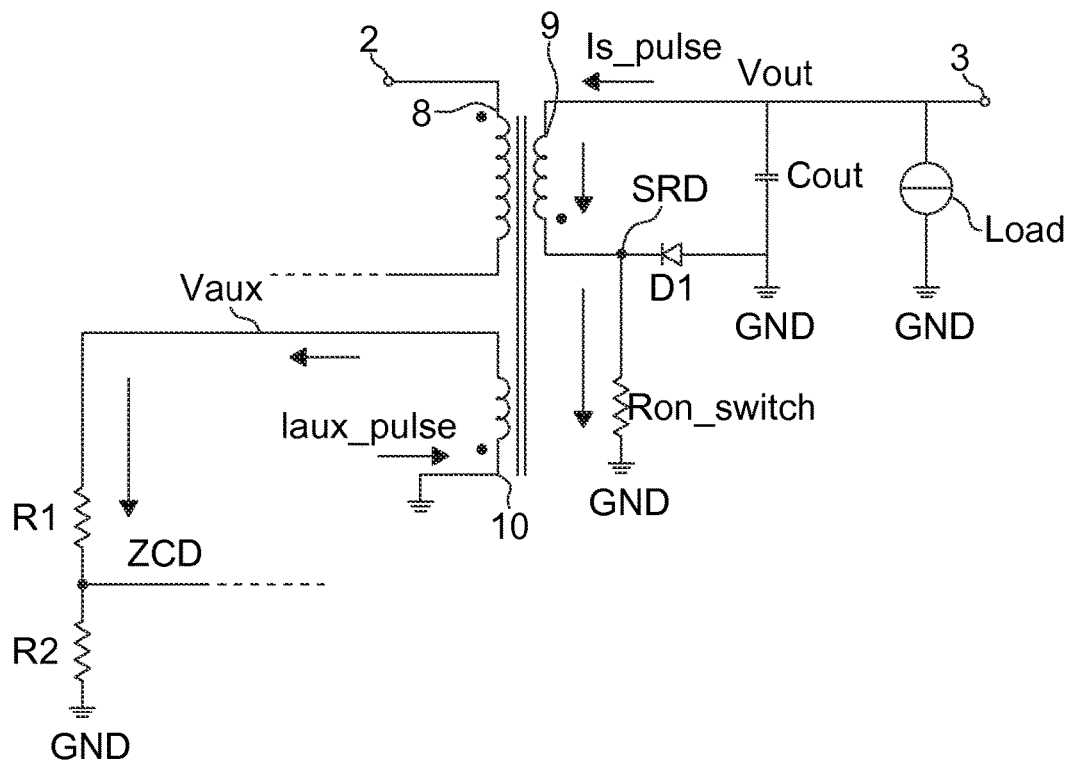
FIG. 3 is a second particular of the block diagram of FIG. 1.

The second signal generator 12 is configured to generate a third enable signal EN3 after the second time period T_inhibit, and to provide it to an AND logic gate 23 which has at its inputs the third enable signal EN3 and the driving signal V_drive2. The AND logic gate 23 is configured to enable the providing of the driving signal V_drive2 to the further switch SW2. For example, the further switch SW2 is a power Mosfet with its drain terminal connected with the secondary winding 9, its source terminal connected with the ground reference GND, and its gate terminal connected with a voltage buffer 27 by means of which the driving signal V_drive2 is received (FIG. 3).

Figure 5:
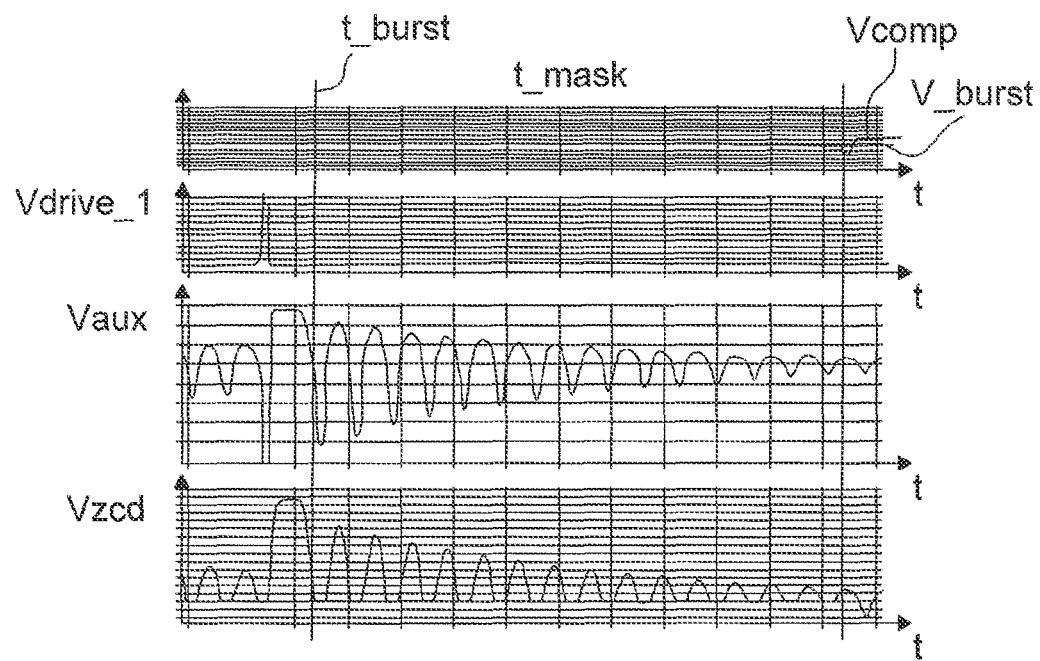
Figure 6:
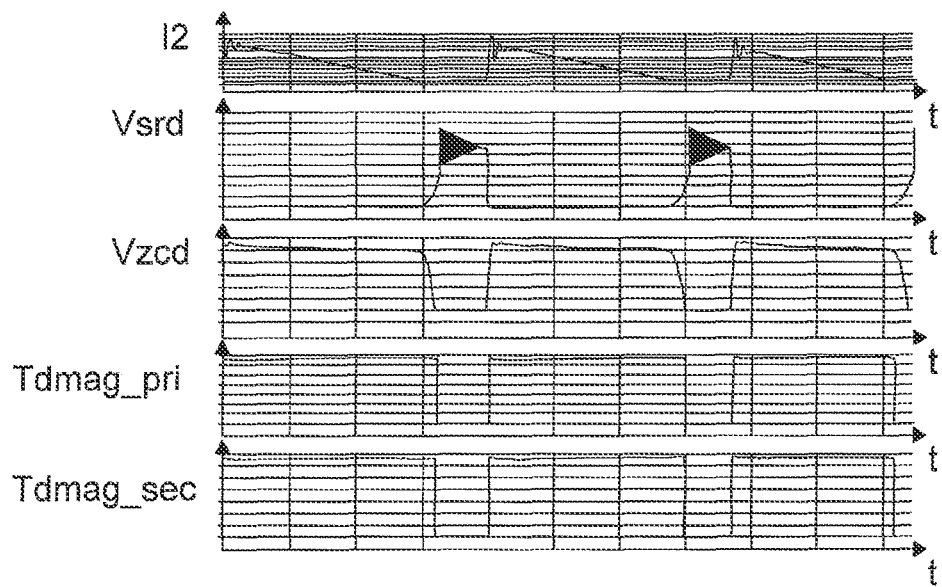

In operation, both the first 18 and second 21 detectors detect and process the voltage across the auxiliary winding 10 and the second winding 9 respectively, and generate a first logic signal Tdmag_pri and a second logic signal Tdmag_sec, respectively (FIG. 6). Preferably, the first Tdmag_pri and the second logic signal Tdmag_sec are high during the demagnetization phase of the transformer 7 and low during the magnetization phase. Due to their nature, the first Tdmag_pri and the second logic signal Tdmag_sec are synchronized and they are used for determining the starting instant for the counting of the first time period T_mask in the receiving section 6 and of the second time period T_inhibit in the transmitting section 5, when the switching converter 1 enters in burst mode. Said starting instant coinciding with the time instant t_burst (FIG. 5).

In particular, the first signal generator 28 sets the first time period T_mask to "0" when the first logic signal Tdmag_pri is high, and the first time period T_mask to "1" when the first logic signal Tdmag_pri is low. In the same way, the second signal generator 12 sets the second time period T_inhibit.

When the power switching converter 1 enters in burst mode (the voltage Vcomp is lower than the voltage reference Vburst) the first Tdmag_pri and the second logic signal Tdmag_sec are both low for a time greater than the first T_mask and the second time period T_inhibit, respectively (FIGS. 5, 6). After the first time period T_mask the first signal generator 28 enables the wake up pulse Vaux_pulse reception, while, after the second time period T_inhibit the second signal generator 12 enables the sending of the wake up pulse Vaux_pulse. Thus, the second enabling circuit B have to wait for a period of time greater than the first time period T_mask to provide the wake up signal Vaux_pulse to the receiving section 6, in order that it could be correctly detected by the wake up detector 11.

Figure 4:
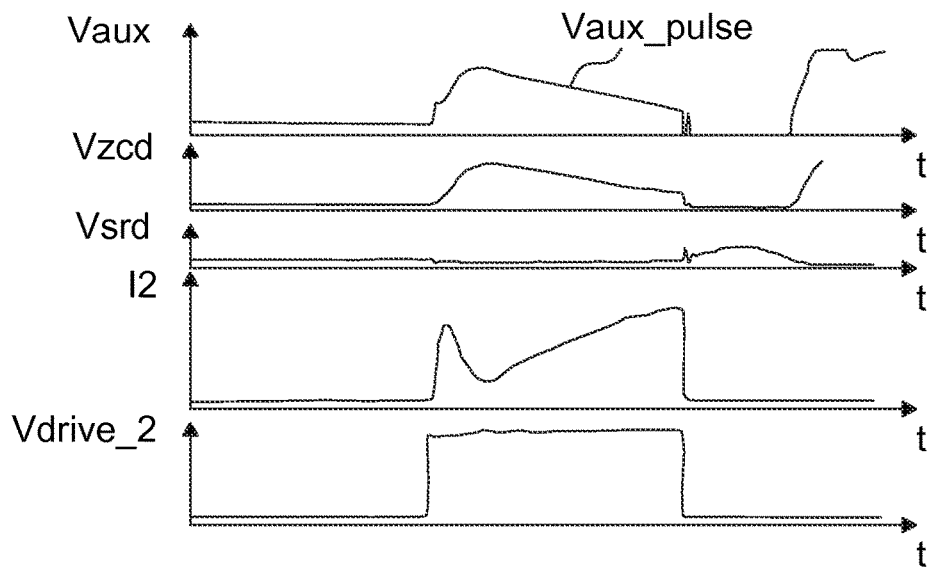
FIG. 4-6 are time diagrams showing the signals in play in the switching power converter.

If during the burst-mode operation, the output signal Vout falls below a prefixed threshold value Ref, the second enabling circuit B sends the wake up signal Vaux_pulse after the second time period T_inhibit from the switching-off time instant t_burst which is greater than the first time period T_mask (FIG. 4). In particular, the AND logic gate 23 provides the driving signal V_drive2 suitable to switch-on the further switch SW2. The wake up signal Vaux_pulse is an inducted voltage across the auxiliary winding 10 due to an inducted current pulse Iaux_pulse generated by the flowing of a current Is_pulse in the secondary winding 9 (FIGS. 3, 4).

The transfer of the wake up signal Vaux_pulse through the transformer 7 in combination with the synchronization between the receiving 6 and the transmitting sections 5 of the wake up circuit allows an optimization of the time of response of the receiving 6 when variations of the load LOAD, and as a result, an optimization of the power dissipation.

The invention claimed is:

1. A power switching converter, comprising:
   an input terminal configured to receive an input signal,
   an output terminal connectable to a load,
   a switch coupled to the input terminal,
   a control circuit configured to drive said switch to provide at the output terminal a regulated output signal,
   a transformer with a primary winding coupled to the input terminal, a secondary winding coupled to the output terminal and an auxiliary winding coupled to the control circuit,
   a wake up circuit configured to force switching-on of the switch when the power switching converter enters in a burst-mode,
   wherein the wake up circuit comprises:
       a transmitting section coupled to the output terminal, and
       a receiving section coupled to the control circuit,
       said transmitting section configured to provide a wake up signal to the receiving section in a wireless way when the regulated output signal falls below a threshold value, the wake up signal being an inducted voltage across the auxiliary winding due to an inducted current pulse generated by flow of a current through the secondary winding,
       wherein the receiving section comprises a first enabling circuit configured to enable a transfer of the wake up signal from the transmitting section to the control circuit following turn off of the switch and after a first time period during which voltage amplitude fluctuations on the auxiliary winding occur following a final time instant of a demagnetization of the transformer, said voltage amplitude fluctuations caused by power exchange between a magnetization inductance of the transformer and a parasitic capacitance after turn off of the switch.

2. The power switching converter according to claim 1, wherein said transmitting section comprises: a second enabling circuit configured to provide the wake up signal to the receiving section after a second time period from the final time instant of the demagnetization of the transformer, said second time period being greater than the first time period.

3. The power switching converter according to claim 2, wherein said second enabling circuit comprises:
   a second detector cascaded with a second signal generator, said second detector being coupled with the secondary winding and configured to detect a voltage across the secondary winding and define the final time instant of the demagnetization of the transformer, said second signal generator being configured to generate a third enable signal after the second time period, and
   a logic gate which has at inputs of the logic gate the third enable signal and the driving signal, said logic gate configured to enable providing of the driving signal to a further switch.

4. The power switching converter according to claim 1, wherein said first enabling circuit comprises:
   a first detector cascaded with a first signal generator, said first detector being coupled to the auxiliary winding and configured to detect the demagnetization of the transformer through a voltage across the auxiliary winding and to define the final time instant of the demagnetization of the transformer, said first signal generator being configured to generate a first enabling signal after the first time period from the final time instant of the demagnetization of the transformer,
   a first voltage comparator configured to compare a voltage responsive of a feedback voltage with a voltage reference and generate, as a result of the comparison, a second enabling signal, and
   a logic gate which has at inputs of the logic gate the first enabling signal, the second enabling signal and a wake up pulse provided by a wake up detector, coupled with the auxiliary winding, as a response to a detection of the wake up signal, said logic gate being configured to enable the providing of the wake up pulse to a driving section connected to the control circuit.

5. The power switching converter according to claim 4, wherein said transmitting section comprises a second voltage comparator and a further switch coupled between the secondary winding and a ground reference, said voltage comparator being configured to compare the output signal with the threshold value and, if the regulated output signal is lower than the threshold value, to generate by means of a pulse generator a driving signal suitable to switch-on the further switch.

6. A method for converting an input signal to a regulated output signal using a switching power converter that includes: an input terminal configured to receive the input signal, an output terminal connectable to a load, a switch coupled to the input terminal, a control circuit configured to drive said switch to provide at the output terminal the regulated output signal, a transformer comprising a primary winding coupled to the input terminal, a secondary winding coupled to the output terminal, and an auxiliary winding coupled to the control circuit, a wake up circuit comprising a transmitting section, coupled to the output terminal, and a receiving section, coupled to the control circuit, said method comprising:
   forcing switching-on of the switch in response to a wake up signal when the switching power converter enters in a burst mode, providing the wake up signal in a wireless way from the transmitting section to the receiving section of the wake up circuit when the regulated output signal falls below a threshold value, enabling a transferring of the wake up signal to the control circuit in response to turning off of the switch and after a first time period during which voltage amplitude fluctuations on the auxiliary winding occur following a final time instant of a demagnetization of the transformer, said voltage amplitude fluctuations caused by power exchange between a magnetization inductance of the transformer and a parasitic capacitance after turning off of the switch.

7. The method according to claim 6, comprising: enabling the providing of the wake up signal by the transmitting section to the receiving section after a second time period from the final time instant of the demagnetization of the transformer, said second time period being greater than the first time period.

8. A circuit, comprising:
a transformer including a primary winding, a secondary winding and an auxiliary winding;
a first switch coupled in series with the primary winding;
a first control circuit configured to actuate the first switch;
a second switch coupled in series with the secondary winding;
a second control circuit configured to actuate the second switch in response to an output voltage at the secondary winding so as to generate a wake-up signal that is wirelessly communicated through the transformer to the auxiliary winding; and
wherein the first control circuit comprises a receiving circuit coupled to the auxiliary winding and configured to receive the wake-up signal following turn off of the first switch and after a first time delay during which voltage amplitude fluctuations on the auxiliary winding occur following demagnetization of the transformer, said voltage amplitude fluctuations caused by power exchange between a magnetization inductance of the transformer and a parasitic capacitance after the first switch is turned off.

9. The circuit of claim 8, wherein the circuit is a power converter and the first control circuit forces on the first switch when the power converter enters in a burst-mode of operation.

10. The circuit of claim 8, wherein the wake up signal is an inducted voltage across the auxiliary winding in response to an inducted current pulse generated by a flow of a current through the secondary winding in response to actuation of the second switch.

11. The circuit of claim 8, wherein the second control circuit includes an enable circuit configured to enable transmission of the wake up signal after a second time delay, wherein the second time delay is longer than the first time delay.

12. The circuit of claim 8, wherein the parasitic capacitance comprises a parasitic capacitance of the first switch.

* * * * *